(12) United States Patent
Tang

(10) Patent No.: US 7,740,289 B2
(45) Date of Patent: Jun. 22, 2010

(54) HOUSING OF FOLDABLE ELECTRONIC DEVICE

(75) Inventor: Zi-Ming Tang, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/131,133

(22) Filed: Jun. 2, 2008

(65) Prior Publication Data

US 2009/0168340 A1 Jul. 2, 2009

(30) Foreign Application Priority Data

Dec. 27, 2007 (CN) .................... 2007 1 0203492.4

(51) Int. Cl.
*E05C 19/06* (2006.01)
*E05C 19/00* (2006.01)

(52) U.S. Cl. .............................. 292/80; 292/84; 292/87; 292/89; 292/303; 292/DIG. 11; 292/DIG. 37

(58) Field of Classification Search .................... 292/80, 292/87, 89, 121, 128, 303, DIG. 11, DIG. 31, 292/DIG. 37, DIG. 61, DIG. 63
See application file for complete search history.

(56) References Cited

U.S. PATENT DOCUMENTS

| | | | | |
|---|---|---|---|---|
| 86,686 A * | 2/1869 | Peterson | ..................... | 292/121 |
| 274,497 A * | 3/1883 | Judson | ........................ | 292/121 |
| 2,203,202 A * | 6/1940 | Kun | .............................. | 292/87 |
| 3,044,287 A * | 7/1962 | Pelcin | ............................ | 70/99 |
| 4,730,731 A * | 3/1988 | Allison | ........................ | 206/540 |
| 4,964,661 A * | 10/1990 | Cadwell et al. | ............... | 292/87 |
| 5,044,810 A * | 9/1991 | Matsuoka et al. | ............. | 403/93 |
| 5,158,329 A * | 10/1992 | Schlack | ........................ | 292/87 |
| 5,785,398 A * | 7/1998 | Park | ........................ | 312/223.2 |
| 6,296,334 B1 * | 10/2001 | Liao | ........................ | 312/223.2 |
| 6,890,008 B1 * | 5/2005 | Chuang et al. | ............... | 292/121 |
| 7,277,277 B2 * | 10/2007 | Bang | ........................... | 361/683 |
| 7,464,819 B2 * | 12/2008 | Maietta | ....................... | 206/536 |

FOREIGN PATENT DOCUMENTS

FR 2686118 A1 * 7/1993

\* cited by examiner

*Primary Examiner*—Carlos Lugo
(74) *Attorney, Agent, or Firm*—Zhigang Ma

(57) ABSTRACT

An exemplary housing of a foldable electronic device includes a first cover, a second cover, and a button disposed on the second cover. The first cover includes a lock receiving portion. The button includes a main body, a lock portion, and a resilient portion. The lock portion is configured for engaging with the lock receiving portion. The lock portion and the resilient portion connect with the main body. The main body includes a contact portion and a pivot portion. The contact portion and the pivot portion are separated from each other at a predetermined distance. The main body is rotatably disposed on the second cover by the pivot portion. The resilient portion is located on another end opposite to the pivot portion.

13 Claims, 8 Drawing Sheets

HOUSING OF FOLDABLE ELECTRONIC DEVICE

BACKGROUND OF THE INVENTION

1. Field of the Invention

The present invention generally relates to housings of foldable electronic devices, and particularly, to a housing typically used for a notebook.

2. Discussion of the Related Art

Referring to FIGS. 7 and 8, a housing 10 of a foldable electronic device is shown. The housing 10 includes a bottom cover 11, a top cover 12, a sliding member 13, a hook 14, and a spring 15. The bottom cover 11 defines a latching groove 111 adjacent to an edge of the bottom cover 11. The top cover 12 defines a rectangular mounting groove 121 in an edge of the top cover 12 and forms a resisting member 123 adjacent to the mounting groove 121. The sliding member 13 is a rectangular block in shape. The sliding member 13 is disposed in the mounting groove 121 and is able to slide left or right along an edge, which parallels the bottom cover 11, of the mounting groove 121. The hook 14 is configured to be latched in the latching groove 111. The hook 14 includes an end fixed to the sliding member 13 so that the hook 14 is able to move together with the sliding member 13. An end of the spring 15 abuts the resisting member 123 and an opposite end of the spring 15 abuts the sliding member 13 so that the hook 14 and the sliding member 13 are kept on the left side of the mounting groove 121.

To open the top cover 12, a user has to pry the sliding member 13 and drive the sliding member 13 to move towards a right side of the mounting groove 121 with a finger. However, the sliding member 13 is generally designed to have a small volume. Thus, a contact surface of the sliding member 13 is relatively small. In addition, to drive the sliding member 13, the finger exerts a force along a direction to a side of the sliding member 13, and the finger can easily slip on the sliding member 13. As a result, it is difficult to open the top cover 12.

Therefore, a new housing of a foldable electronic device is desired in order to overcome the above-described shortcomings.

SUMMARY

A housing of a foldable electronic device includes a first cover, a second cover, and a button positioned on the second cover. The first cover includes a lock receiving portion. The button includes a main body, a locking portion, and a resilient portion. The locking portion is configured for engaging with the lock receiving portion. The locking portion and the resilient portion connect with the main body. The main body includes a contact portion and a pivot portion. A portion of the contact portion is exposed out of the second cover. The contact portion and the pivot portion are separated from each other at a predetermined distance. The main body is rotatably disposed on the second cover by the pivot portion. The resilient portion is located on another end opposite to the pivot portion.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present housing of the foldable electronic device. Moreover, in the drawings, like reference numerals designate corresponding parts throughout several views, and all the views are schematic.

DETAILED DESCRIPTION OF THE PREFERRED EMBODIMENT

Reference will now be made to the drawings to describe a preferred embodiment of the present housing of the foldable electronic device in detail.

The present housing is used for a foldable electronic device such as a notebook, a cell phone, a media player, and so on. In the preferred embodiment, a housing of a notebook is taken as exemplary to describe the housing of the present invention.

Figure 1:
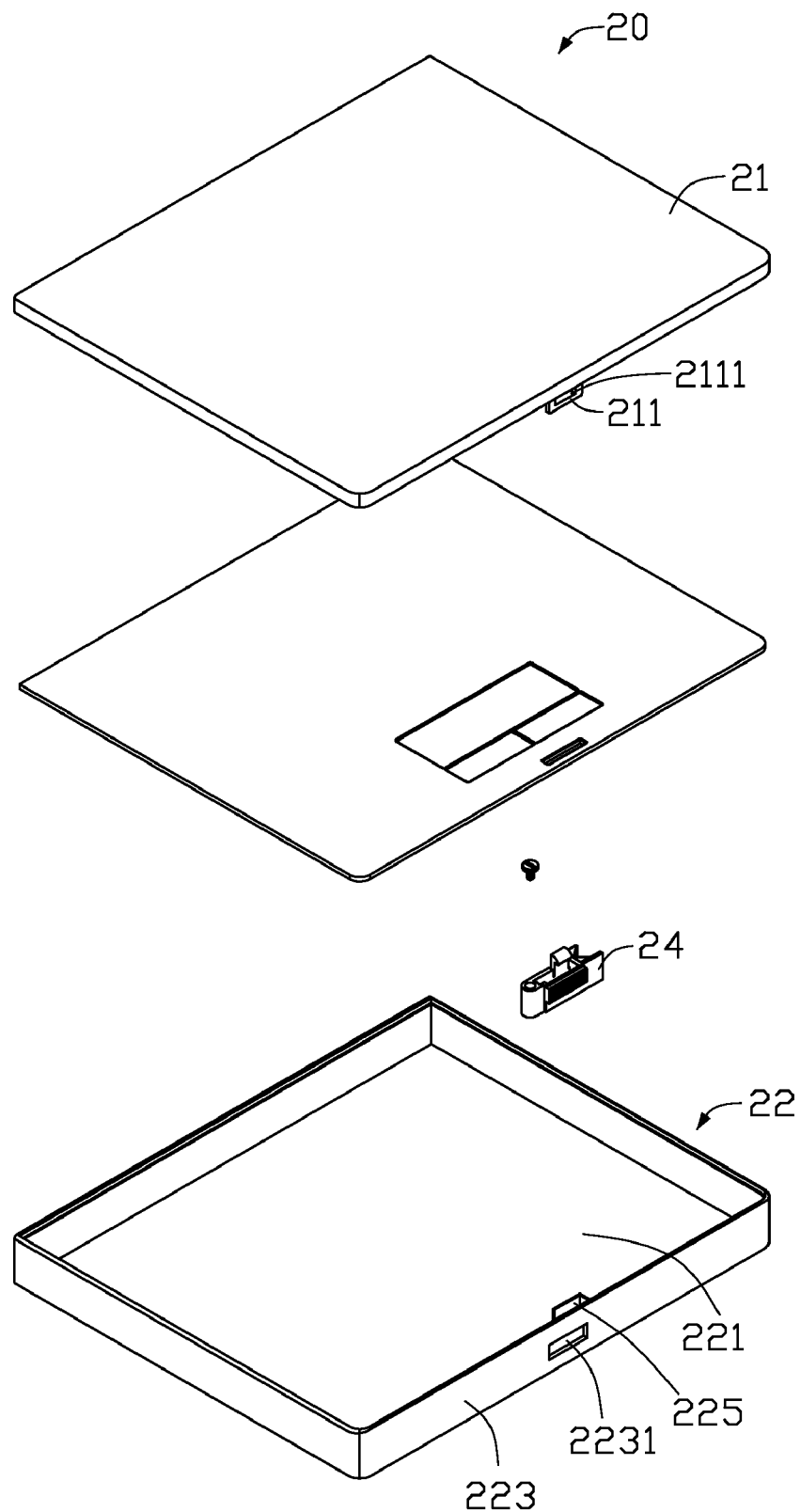
FIG. 1 is an exploded, isometric view of a housing of a foldable electronic device in accordance with a preferred embodiment of the present invention.
Figure 2:
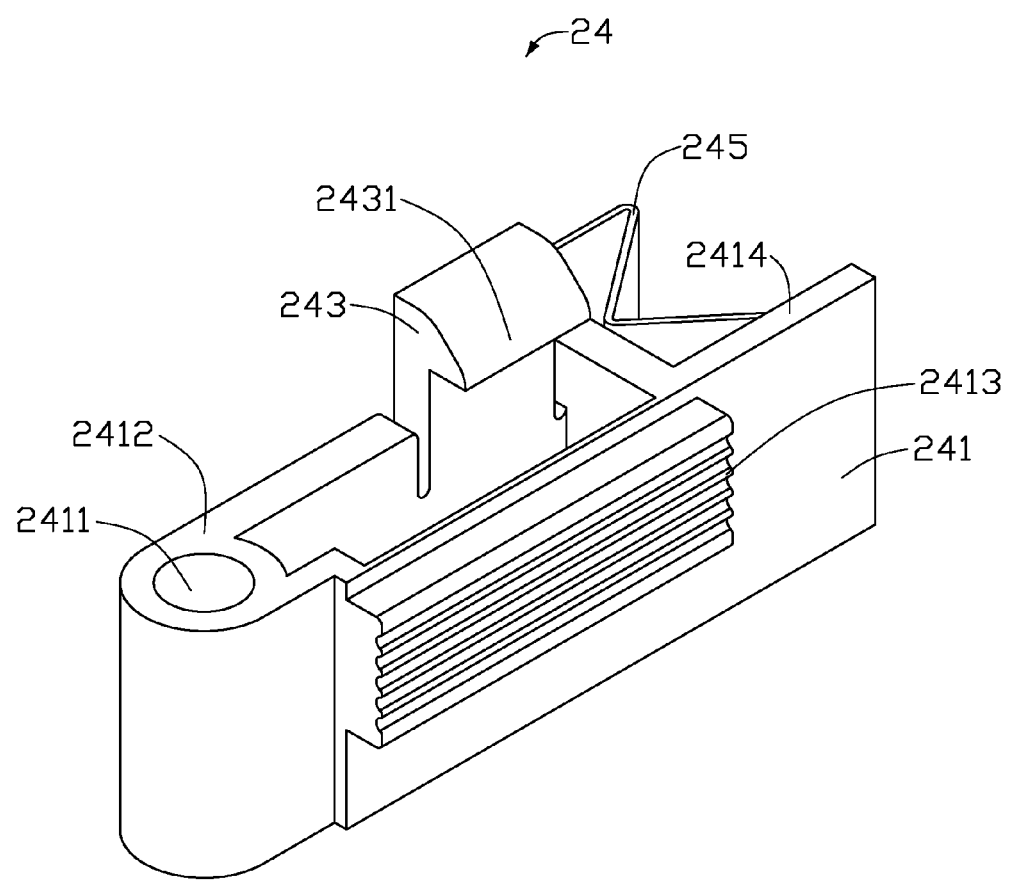
FIG. 2 is an isometric view of a button of the foldable electronic device of FIG. 1.

Referring to FIG. 1, a housing 20 of a notebook of the invention is shown. The housing 20 includes a top cover 21, a bottom cover 22, and a button 24 disposed on the bottom cover 22. The top cover 21 includes a lock receiving portion 211. The lock receiving portion 211 is a portion of the top cover 21. In the illustrated embodiment, the lock receiving portion 211 is integrally formed with the top cover 21 and a notch 2111 is defined in the in the lock receiving portion 211.

Figure 4:
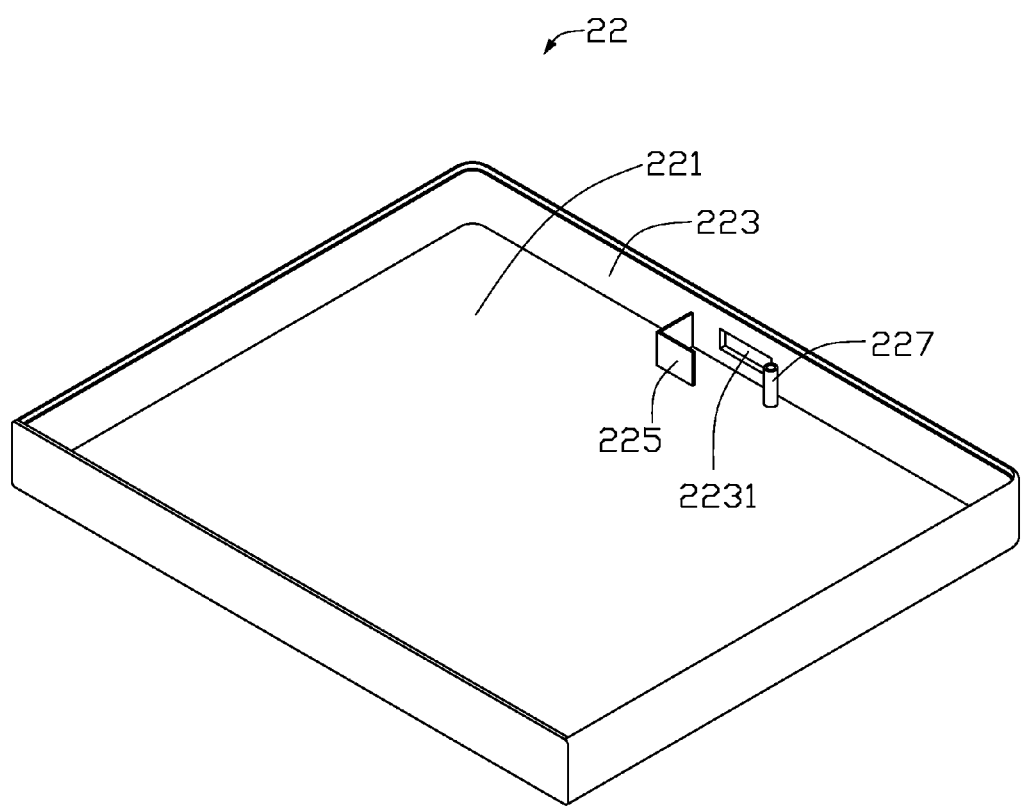
FIG. 4 is an isometric view of a bottom cover of the foldable electronic device of FIG. 1.

Referring to FIG. 4, the bottom cover 22 includes a base 221 and a plurality of sidewalls 223. The sidewalls 223 extend from the base 221. One of the sidewalls 223 (hereafter 223a) defines an opening 2231. The base 221 forms a resisting member 225 and a fixing member 227. The resisting member 225 and the fixing member 227 are adjacent to the opening 2231. The resisting member 225 and the fixing member 227 are separated from each other at a predetermined distance. In the illustrated embodiment, the resisting member 225 is an L-shaped protrusion with an end of the resisting member 225 connecting the sidewall 223a. Thus, the resisting member 225 and the sidewall 223a cooperatively define a U-shaped space. The fixing member 227 is substantially a cylindrical protrusion.

Figure 3:
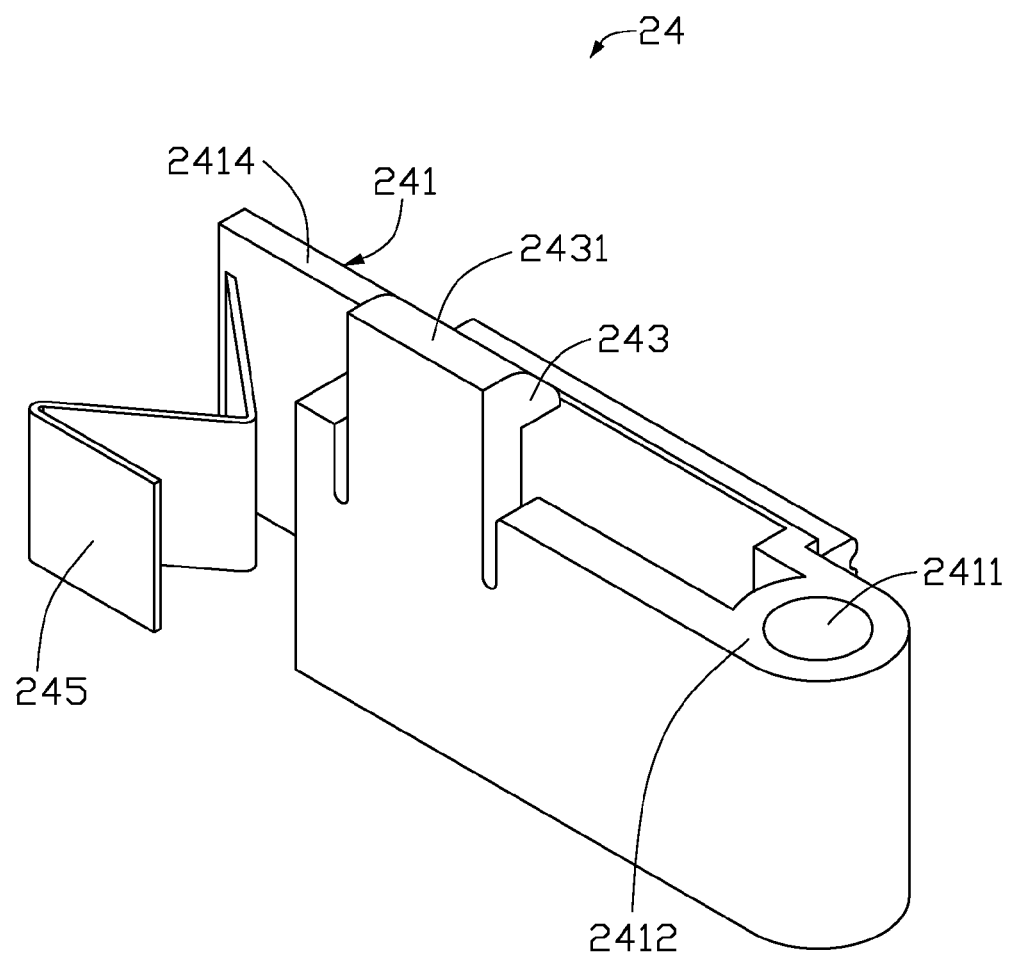
FIG. 3 is similar to FIG. 2, but showing the button viewed from another aspect.

Referring to FIGS. 3 and 4, the button 24 includes a main body 241, a locking portion 243, and a resilient portion 245. The locking portion 243 and the resilient portion 245 are integrally formed with the main body 241. An end 2412 of the main body 241 forms a pivot hole 2411 and another end 2414 of the main body 241 forms the resilient portion 245 opposite to the end 2412 correspondingly. In the illustrated embodiment, a diameter of the pivot hole 2411 is larger than that of the fixing member 227 such that the fixing member 227 is engagable in the pivot hole 2411. The resilient portion 245 is substantially an S-shaped resilient member. Furthermore, a contact portion 2413 is formed on a side surface of the main body 241. The contact portion 2413 is smaller than the opening 2231 such that the contact portion 2413 is able to pass through the opening 2231. In addition, the contact portion 2413 and the pivot hole 2411 are separated from each other at a predetermined distance, such that the main body 241 is able to rotate relative to the pivot hole 2411 when the contact portion 2413 is pressed. The resisting member 225 is configured for resisting the button 24.

In the illustrated embodiment, the locking portion 243 is integrally formed with the main body 241, and the locking portion 243 is a resilient hook. The locking portion 243 is elastic, an outer surface 2431 of the locking portion 243 is curved. When the curved outer surface 2431 of the locking portion 243 is pushed by an outer surface of the lock receiving portion 211, the curved outer surface 2431 of the locking portion 243 allows the locking portion 243 to engage with the lock receiving portion 211 easily.

In assembly, the fixing member 227 is inserted into the pivot hole 2411, the contact portion 2413 extends out from the opening 2231, an end of the resilient portion 245 abuts the resisting member 225. Thus, the main body 241 is rotatably disposed on the bottom cover 22.

It should be pointed out that, in the illustrated embodiment, the fixing member 227 is a cylindrical protrusion, in an assembly process, the cylindrical protrusion is insertable into the pivot hole 2411 directly, there is no special configurations needed, thus the assembly process of the housing 20 is simplified.

Figure 5:
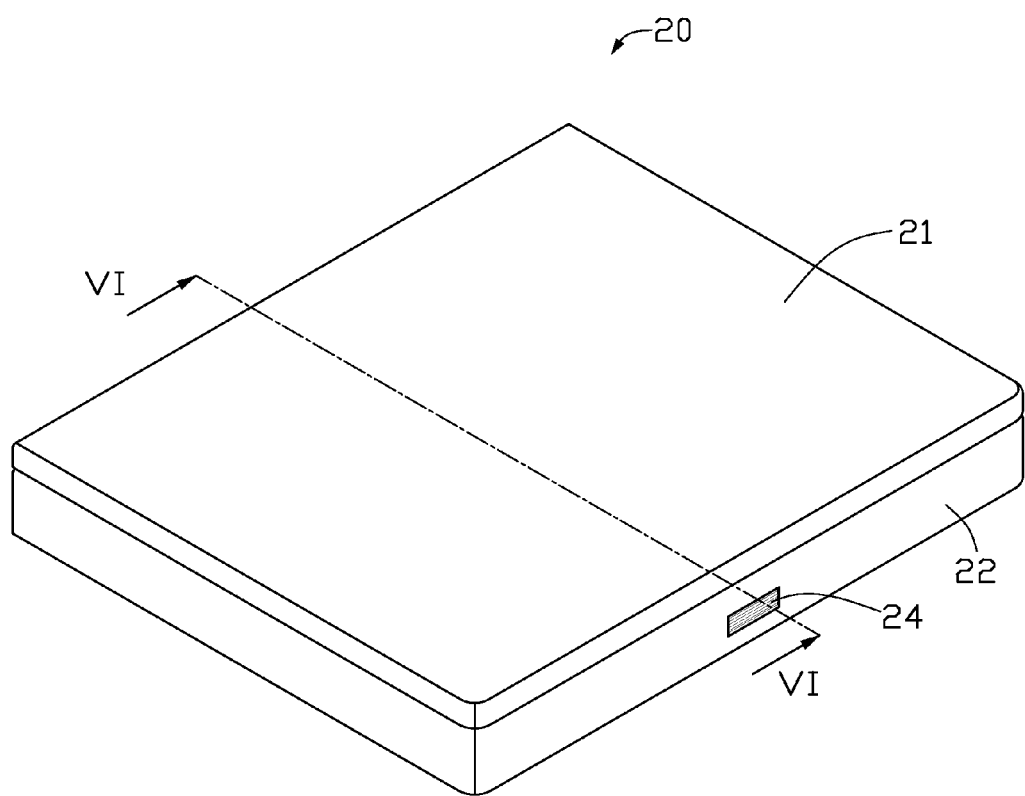
FIG. 5 is an assembled, isometric view of the housing of FIG. 1 when a top cover of the housing is closed.
Figure 6:
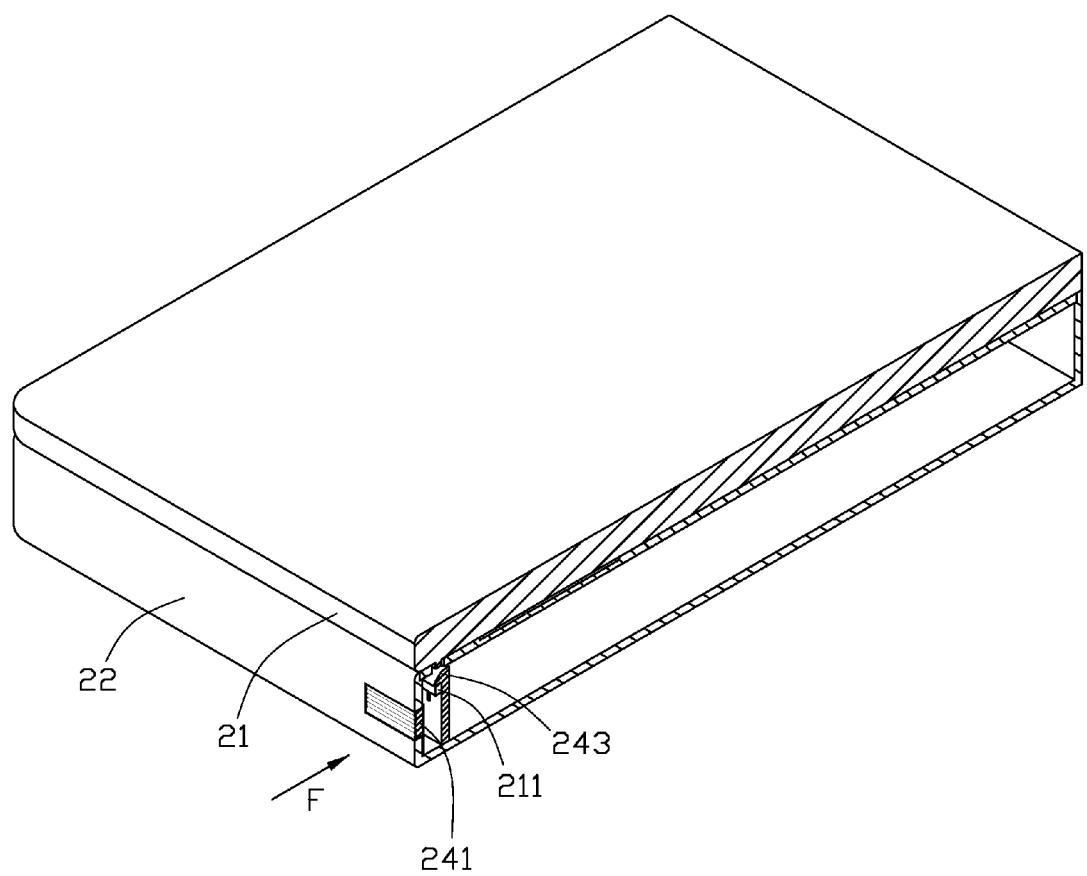
FIG. 6 is a side, cross-sectional view of the housing of FIG. 5, taken along line VI-VI of FIG. 5.
Figure 7:
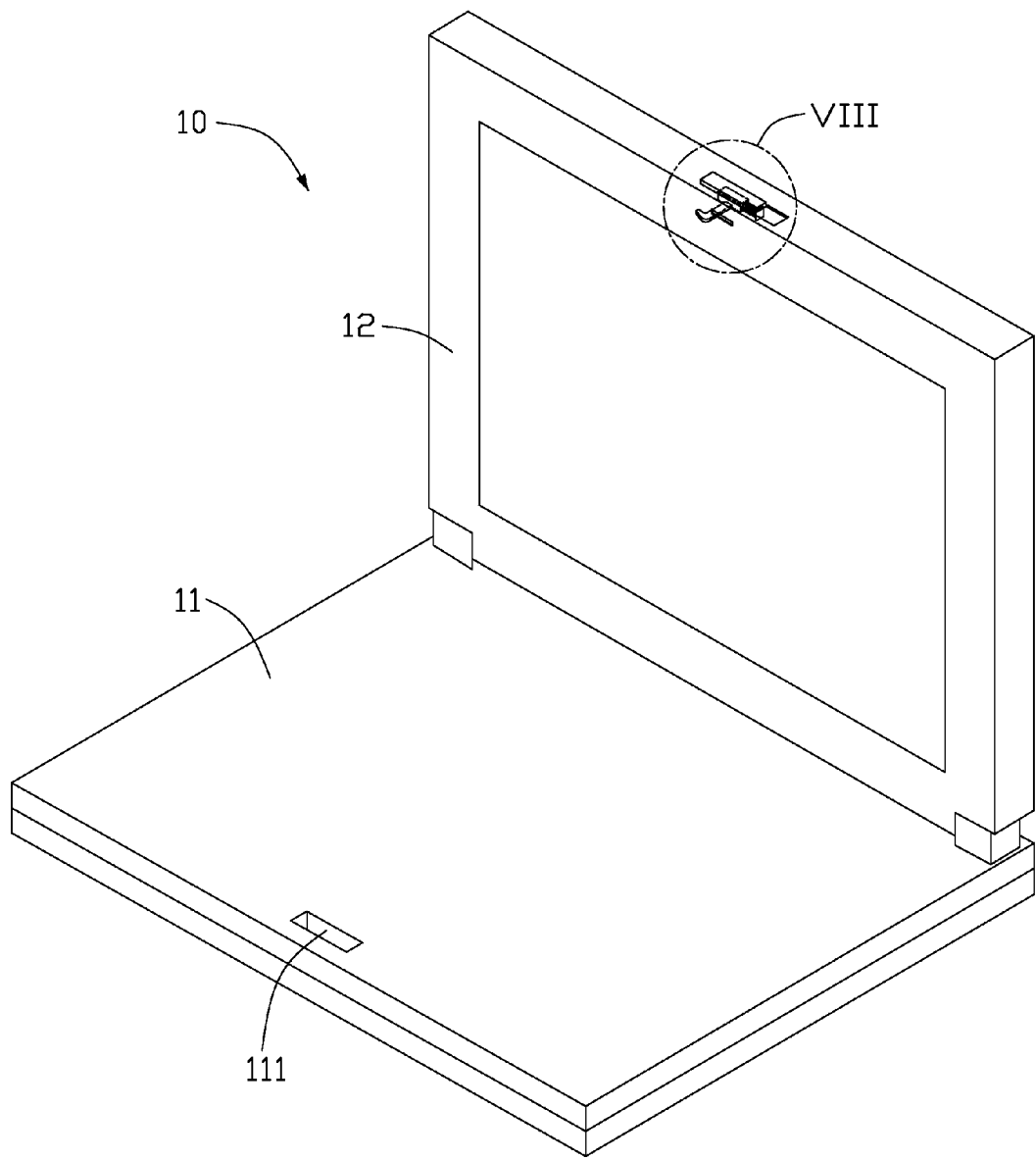
FIG. 7 is an isometric view of a conventional housing of a foldable electronic device.
Figure 8:
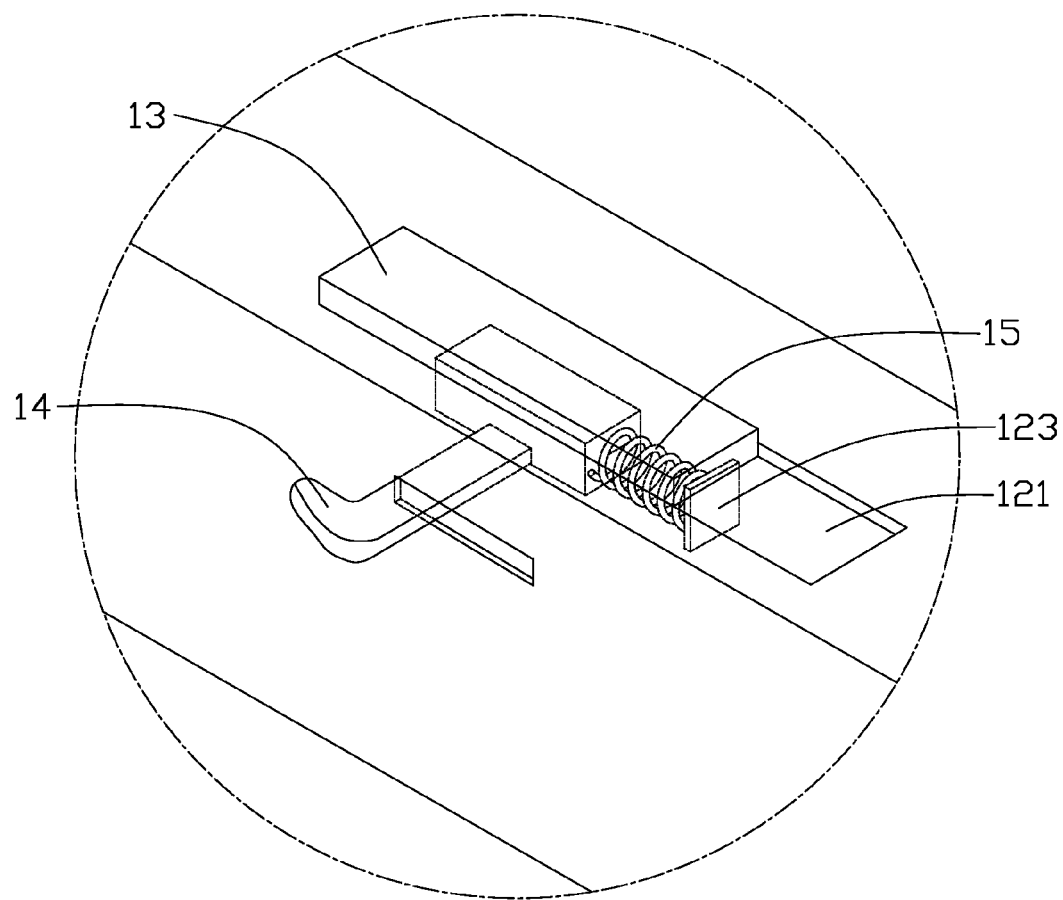
FIG. 8 is an enlarged view of a circled portion VIII of FIG. 7.

Referring to FIGS. 5 and 6, when the notebook is in a normal state, the top cover 21 is folded atop of the bottom cover 22. In this state, the lock receiving portion 211 is secured to the locking portion 243.

To open the top cover 21, the contact portion 2413 is pressed, the main body 241 exerts a force on the resilient portion 245 and the fixing member 227. The resilient portion 245 becomes compressed and accumulates potential energy, furthermore, the main body 241 rotates relative to the fixing member 227. As a result, the main body 241 rotates and drives the locking portion 243 to become unlatched from the lock receiving portion 211. When the top cover 21 is opened, the pressing force exerted on the button 24 can be released, and the main body 241 is pushed by the resilient portion 245 and rotates to return to an original (normal) position.

To close the top cover 21, an external force is manually applied on the top cover 21 in a direction towards the bottom cover 22. The lock receiving portion 211 pushes the outer surface 2431 of the locking portion 243 away from the sidewall 223a, thus the locking portion 243 initially bends outward before being latched to the lock receiving portion 211 of the top cover 21.

In the above mentioned housing 20, when pressing the main body 241, the main body 241 rotates such that the locking portion 243 is released from the lock receiving portion 211, thus the top cover 21 is openable. When the main body 241 is pressed, an external force F (shown in FIG. 6) substantially perpendicular to the main body 241 is applied to the main body 241. Therefore, finger seldom slips on the button 24, and the top cover 21 is opened easily.

It should be pointed that, the lock receiving portion 211 and the locking portion 243 can be resilient hook. Furthermore, the lock receiving portion 211 and the top cover 21 can be separated, and the locking portion 243 and the main body 241 can also be separated. For example, the locking portion 243 can be a separated member which is fixed to the main body 241 by a screw means. The resilient portion 245 and the main body 241 can be separated. In addition, the resilient portion 245 can be a spring.

The resilient portion 245 pushes the main body 241 when the resilient portion 245 and the contact portion 2413 are on opposite sides of the main body 241. The resilient portion 245 will pull the main body 241 when the resilient portion 245 and the contact portion 2413 are on a same side of the main body 241. In addition, the resisting member 225 also can be a separated member.

The fixing member 227 can be replaced with a fixing portion such as a pivot hole 2411, correspondingly, the pivot hole 2411 should be replaced with a pivot portion such as a cylindrical protrusion.

A plurality of elongated grooves (not labeled) can be defined in a surface of the contact portion 2413 in order to achieve a good sense of touch.

When at least a portion of the contact portion 2413 is exposed out of the bottom cover 22, the opening 2231, the fixing member 227, and the resisting member 225 can be omitted.

Supposing the bottom cover 22 is a first cover and the top cover 21 is a second cover, the button 24 can be positioned on either of the first cover and the second cover. Supposing the top cover 21 is a first cover and the bottom cover 22 is a second cover, the button 24 can be positioned on either of the first cover and the second cover.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A locking assembly for locking a first cover to a second cover of a foldable electronic device, comprising:
   a lock receiving portion positioned on the first cover;
   a locking mechanism positioned on the second cover, said locking mechanism comprising:
   a button including a main body, a locking portion, a pivot portion, a contact portion and a resilient portion,
   wherein the contact portion is formed at a first side of the main body;
   the pivot portion, the locking portion and the resilient portion are formed at a second side of the main body;
   the pivot portion and the resilient portion are correspondingly located at two ends of the second side of the main body;
   the main body is rotatably positioned on the second cover by the pivot portion;
   the locking portion is located between the pivot portion and the resilient portion;
   the contact portion and the pivot portion are separated from each other at a predetermined distance;
   at least a portion of the contact portion is exposed out of the second cover by the resilient portion;
   wherein, when the first cover engages the second cover, the locking portion will engage the lock receiving portion;
   wherein, when the exposed portion of the contact portion is pushed in a direction toward the second cover against the resilient portion, so that the main body is rotated to drive the locking portion out of engagement with the lock receiving portion, allowing the first cover to move out of engagement with respect to the second cover.

2. The locking assembly as claimed in claim 1, wherein the second cover defines an opening therein and the contact portion is positioned in the opening.

3. The locking assembly as claimed in claim 1, wherein the second cover comprises a fixing portion and the pivot portion is fixed to the fixing portion.

4. The locking assembly as claimed in claim 3, wherein the fixing portion is a cylindrical protrusion and the pivot portion is a hole.

5. The locking assembly as claimed in claim 1, wherein the second cover comprises a resisting member, an end of the resilient portion connects with the main body and another end of the resilient portion abuts the resisting member.

6. The locking assembly as claimed in claim 5, wherein the resisting member is a protrusion formed on the second cover, the resilient portion is formed integrally with the main body.

7. The locking assembly as claimed in claim 6, wherein the resilient portion is an "S"-shaped elastic member.

8. The locking assembly as claimed in claim 1, wherein at least one of the lock receiving portion and the locking portion is a resilient hook.

9. The locking assembly as claimed in claim 8, wherein an outer surface of the locking portion is curved.

10. The locking assembly as claimed in claim 1, wherein the locking portion is integrally formed with the main body.

11. The locking assembly as claimed in claim 1, wherein the resilient portion and the locking portion are separated.

12. The locking assembly as claimed in claim 11, wherein the resilient portion is a spring.

13. The locking assembly as claimed in claim 1, wherein the surface of the contact portion defines a plurality of depressions therein.

* * * * *